United States Patent
Krishnaprasad et al.

(10) Patent No.: US 6,871,204 B2
(45) Date of Patent: Mar. 22, 2005

(54) APPARATUS AND METHOD FOR MAPPING RELATIONAL DATA AND METADATA TO XML

(75) Inventors: Muralidhar Krishnaprasad, Foster City, CA (US); Viswanathan Krishnamurthy, Fremont, CA (US); Ravi Murthy, Hayward, CA (US); Visar Nimani, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 253 days.

(21) Appl. No.: 09/948,949

(22) Filed: Sep. 6, 2001

(65) Prior Publication Data

US 2002/0099687 A1 Jul. 25, 2002

Related U.S. Application Data

(60) Provisional application No. 60/230,878, filed on Sep. 7, 2000.

(51) Int. Cl.$^7$ .............................................. G06F 17/30
(52) U.S. Cl. ...................... 707/102; 707/513; 707/514
(58) Field of Search .............................. 707/1, 2, 3, 4, 707/5, 6, 7, 8, 9, 10, 103, 104.1, 517, 514, 513

(56) References Cited

U.S. PATENT DOCUMENTS

| | | | |
|---|---|---|---|
| 5,999,941 A | 12/1999 | Andersen | 707/103 R |
| 6,012,067 A | 1/2000 | Sarkar | 707/103 |
| 6,240,407 B1 * | 5/2001 | Chang et al. | 707/2 |
| 6,366,934 B1 * | 4/2002 | Cheng et al. | 715/513 |
| 6,418,448 B1 * | 7/2002 | Sarkar | 707/104.1 |
| 6,449,620 B1 | 9/2002 | Draper et al. | 707/102 |
| 6,584,459 B1 | 6/2003 | Chang et al. | 707/3 |
| 6,604,100 B1 | 8/2003 | Fernandez et al. | 707/3 |
| 6,636,845 B2 | 10/2003 | Chau et al. | 707/1 |
| 6,643,633 B2 | 11/2003 | Chau et al. | 707/1 |
| 2002/0015042 A1 | 2/2002 | Robotham et al. | |
| 2002/0120685 A1 | 8/2002 | Srivastava et L. | |
| 2002/0124100 A1 | 9/2002 | Adams | |
| 2003/0014397 A1 | 1/2003 | Chau et al. | |

OTHER PUBLICATIONS

Daniela Florescu et al., "A Performance Evaluation of Alternative Mapping Schemes for Storing XML Data in a Relational Database," May 1999, XP-002168318, pp. 1–31.
"A Performance Evaluation of Storing XML Data in Relational Database Management Systems," –Latifur Khan and Yan Rao –ACM–2001 (pps: 31–38).
"From XML Schema to Relations: A Cost–Based Approach to XML Storage"–Bell Laboratories: Philip Bohannon, Juliana Freire, Prasan Roy and Jerome Simeon –IEEE –2002 – Proceedings of the 18th International Conference on Data Engineering (ICDE'02), 12 pages.
"SRQL: Sorted Relational Query Language" –Raghu Ramakrishnan, Donko Donjerkovic, Arvind Ranganathan, Kevin S. Beyer and Muralidar Krishnaprasad –Jul. 1–3, 1998 IEEE pps: 84–95.
"Oracle8$i$–The XML Enabled Data Management System" –Oracle Corporation: Sandeepan Banerjee, Vishu Krishnamurthy, Muralidar Krishnaprasad and Ravi Murthy –Mar. 2000 IEEE pps: 561–568.

* cited by examiner

Primary Examiner—Diane D. Mizrahi
Assistant Examiner—Yicun Wu
(74) Attorney, Agent, or Firm—Hickman Palermo Truong & Becker LLP; Michael J. Meehan (57) ABSTRACT

Techniques are provided for mapping XML data and metadata from data in relational databases. According to certain embodiments of the invention, a mechanism is provided to allow the user to use a database query to retrieve data form a relational database in the form of XML documents by canonically mapping object relational data to XML data and canonically mapping object relational schemas to XML-Schemas. The mechanism causes the generation of XML-schema information for the XML documents.

30 Claims, 3 Drawing Sheets

| | EMP | |
|---|---|---|
| EMPNO | ENAME | SALARY |
| 2100 | JOHN | 55K |
| 2200 | MARY | 65K |
| ⋮ | ⋮ | ⋮ |

102 — row with 2100, JOHN, 55K
104 — row with 2200, MARY, 65K

FIG. 1A

| EMP | |
|---|---|
| EMPNO | ENAME |
| 2100 | JOHN |
| 2200 | MARY |
| ⋮ | ⋮ |

110 → row with 2100, JOHN
112 → row with 2200, MARY

APPARATUS AND METHOD FOR MAPPING RELATIONAL DATA AND METADATA TO XML

RELATED APPLICATIONS; PRIORITY CLAIM

This application is related to and claims domestic priority under 35 U.S.C. §119(e) from prior U.S. Provisional Patent Application Ser. No. 60/230,878 filed on Sep. 7, 2000 entitled "XML DATA STORAGE, QUERY REWRITES, VISUALIZATION, MAPPING AND REFERENCING", by inventors Muralidhar Krishnaprasad, Viswanathan Krishnamurthy, and Ravi Murthy, the entire disclosure of which is hereby incorporated by reference as if fully set forth herein.

This application is related to U.S. patent application Ser. No. 09/949,020, filed together herewith, entitled "METHOD AND APPARATUS FOR XML VISUALIZATION OF A RELATIONAL DATABASE ANT) UNIVERSAL RESOURCE IDENTIFIERS TO DATABASE DATA AND METADATA," naming as inventors Muralidhar Krishnaprasad, Viswanathan Krishnamurthy, Ravi Murthy, the entire disclosure of which is hereby incorporated by reference as if fully set forth herein; and This application is related to U.S. patent application Ser. No. 09/948,998, filed together herewith, entitled "METHOD AND APPARATUS FOR FLEXIBLE STORAGE AND UNIFORM MANIPULATION OF XML DATA IN A RELATIONAL DATABASE SYSTEM", naming as inventors Muralidhar Krishnaprasad, Viswanathan Krishnamurthy, and Ravi Murthy, the entire disclosure of which is hereby incorporated by reference as if fully set forth herein.

FIELD OF THE INVENTION

The present invention relates generally to relational databases and, more specifically, to mapping relational database data and metadata to XML data, and to providing XML data in response to XML queries.

BACKGROUND OF THE INVENTION

Data within relational databases are typically accessed by sending commands to database servers that manage the databases. Such commands must conform to a database language supported by the database server. Structured Query Language (SQL) is a database language supported by many database systems.

Extensible Markup Language (XML) is a World Wide Web Consortium (W3C) standard for representing data. Many applications are now being designed to expect input data in the form of XML documents. When the data provided to the applications comes from a relational database, the data typically has to be reformatted into an XML document.

When data is presented as an XML document, the recipient of the document must understand the structure of the XML document. When the XML document is generated from the result of a relational database query, the structure of resulting XML document will typically vary based on the nature of the query. Consequently, the process of transforming the relational data to an XML document, and generating data that indicates the structure of the XML document thus produced, can be cumbersome and inflexible.

Based on the foregoing, it is desirable to provide techniques for transforming relational data into XML in an intelligent, flexible and efficient manner.

SUMMARY OF THE INVENTION

Techniques are provided for mapping metadata and data in relational databases to XML data. The XML data may then be provided in response to relational queries that access the underlying relational data.

According to certain embodiments of the invention, a mechanism is provided to allow the user to use a database query to retrieve data from a relational database in the form of XML documents by canonically mapping object relational data to XML data and canonically mapping object relational schemas to XML-Schemas. The mechanism causes the generation of XML-schema information for the XML documents.

XML Namespaces are used to augment the schema information, by mapping database metadata objects in different database schemas to different XML namespaces.

According to a feature of the invention, multiple XML documents are generated and URI references are used between the documents to link them together.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are provided for mapping data and metadata from relational databases to XML. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

The results of a database query is herein referred to as a "SQL result set". When the SQL result set is converted into one or more XML documents, the converted result set is herein referred to as an "XML result set". The data in the relational database is herein referred to as "object relational data" and metadata that is associated with the object relational data is herein referred to as relational database schemas. A relational database schema is a collection of objects, herein referred to as "schema objects". Schema objects are logical structures that directly refer to the data in the relational database. Thus, schema objects include structures such as tables, views, clusters, indexes, etc.

In order that users may submit a query using relational database query language and receive a result set in the form of XML documents, a mechanism is provided for: 1) Mapping of object relational data from the relational database to XML form; 2) Mapping of the relational database schemas to XML form; 3) Generating XML documents from the object relational data and the relational database schemas.

The mechanism for generating XML documents as the result set from object relational data and relational database schemas is based on a set of rules stored in the relational database. Object relational data, either pre-defined or dynamically defined during the processing of the database query, are mapped to corresponding XML data based on the set of rules. Such a mapping is herein referred to as "canonical mapping of object relational data to XML form".

Similarly, relational database schemas are mapped to XML form by mapping the relational database schemas to their corresponding XML-Schemas. Such a mapping is based on a set of rules that are herein referred to as "canonical mapping of relational database schemas to XML-schemas." The canonical mapping of relational database schemas to XML-schemas is described in greater detail herein.

Further, generating an XML result set, i.e., generating XML documents from the SQL result set is based on a set of rules, as described in greater detail herein.

XML Result Set From SQL Result Set

Figure 1A:
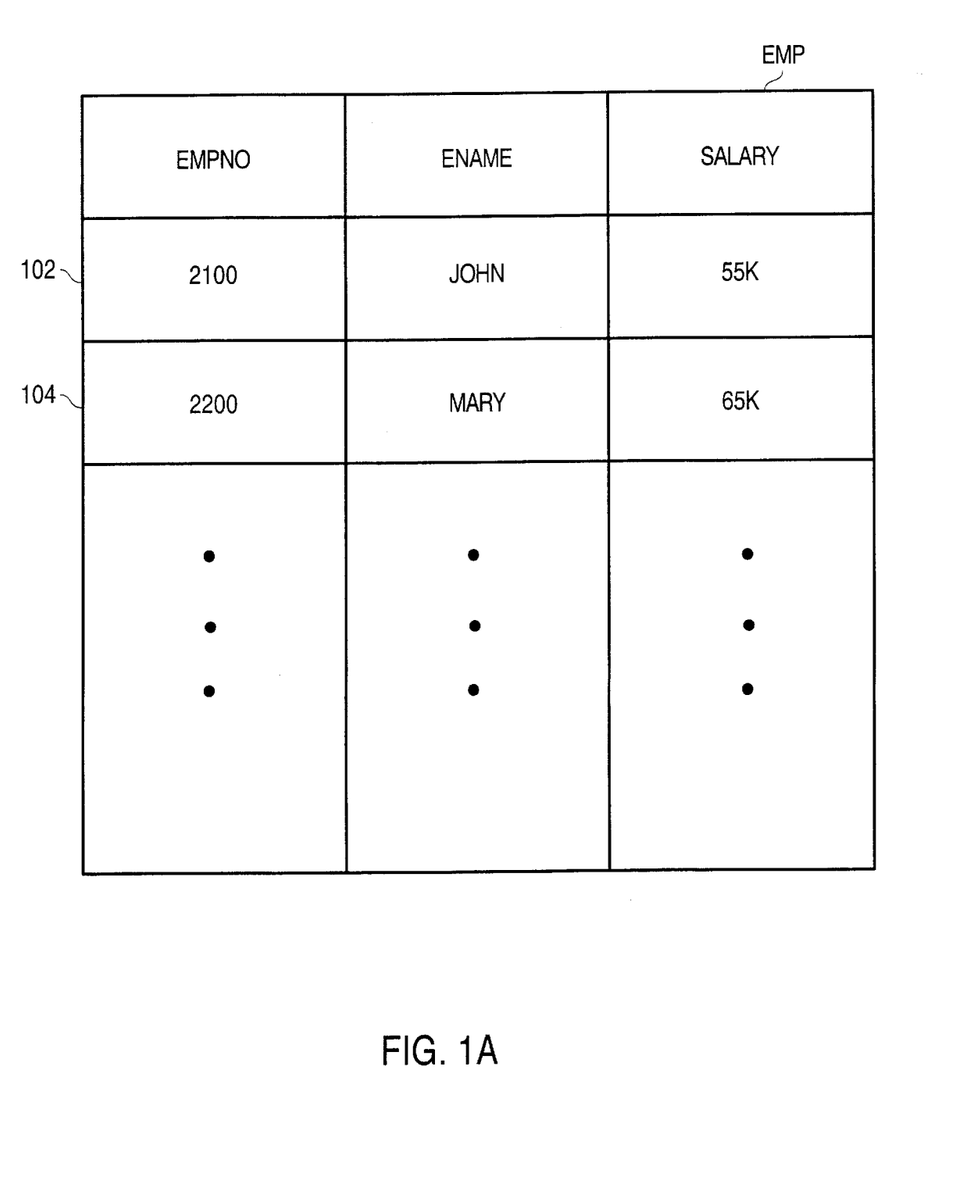
FIG. 1A is a block diagram that illustrates a table.

FIG. 1A is a block diagram that illustrates a table that is stored in a relational database. Table EMP has 3 columns, EMPNO, ENAME and SALARY. Each column of EMP contains a value for each of a plurality of rows of table EMP. However, for simplicity, FIG. 1A shows only 2 rows, namely, row 102 and row 104. In column EMPNO, row 102 contains the value "2100" and row 104 contains the value "2200". Similarly, in column ENAME, row 102 contains the value "JOHN" and row 104 contains the value "MARY". In column SALARY, row 102 contains the value "55K" and row 104 contains the value "65K".

As an example, assume that a user submits a relational database query to retrieve values from two of the columns, namely, EMPNO and ENAME from table EMP. An example of the relational database query is the following SQL statement, SELECT empno, ename FROM emp The syntax used in the preceding statement is merely illustrative. The actual syntax of SQL statements may vary from implementation to implementation. The present invention is not limited to any particular syntax.

Figure 1B:
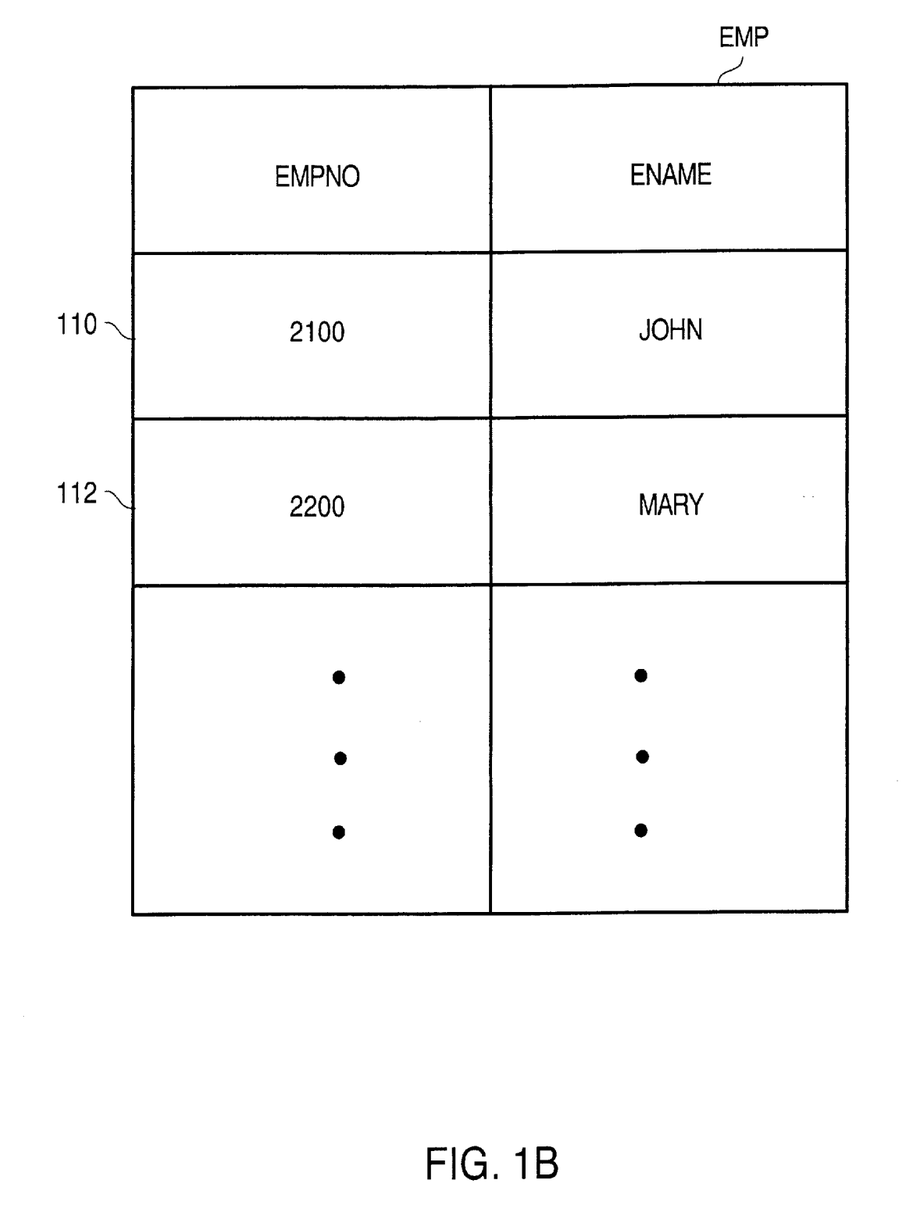
FIG. 1B is a block diagram that illustrates a view that contains a SQL result set.

FIG. 1B is a block diagram that illustrates a view that contains the SQL result set of the SQL statement, SELECT empno, ename FROM emp. The SQL result set comprises only two of columns of table EMP. Thus, FIG. 1B shows only columns EMPNO and ENAME. Even though the SQL result set comprises all the rows of value in columns EMPNO and ENAME, for simplicity, only rows 110 and 112 (which respectively contain values from rows 102 and 104) are shown in FIG. 1B.

The SQL result set of FIG. 1B can be converted into a corresponding XML result set based on the following rules, according to certain embodiments of the invention:

1) The XML result set is in the form of an XML document that begins with a ROWSET tag. The ROWSET tag indicates that the XML document comprises a set of row elements.

2) Each row of the SQL result set is converted to a corresponding ROW element in the XML document where the ROW element is indicated by a pair of ROW tags.

3) Each column within a given row of the SQL result set is converted to a corresponding COLUMN element that is embedded in the encompassing ROW element that in turn corresponds to the given row of the SQL result set. The name of the COLUMN tag is the name of the corresponding column in the SQL result set.

The ROWSET, and ROW tags may have varying monikers in various implementations of the invention. The present invention is not limited to any particular moniker for such tags. As for COLUMN tags, according to one embodiment, an aliasing mechanism is provided for changing names of the COLUMN tags.

To illustrate, the XML result set of the above example may appear like the following:

```
<ROWSET>
    <ROW>
        <EMPNO>2100</EMPNO>
        <ENAME>John</ENAME>
    </ROW>
        <EMPNO>2200</EMPNO>
        <ENAME>Mary</ENAME>
    <ROW>
        ...<!-- other column elements -->
    </ROW>
        ...<!-- other row elements -->
</ROWSET>
```

Mapping of Object Relational Data

An example of the canonical mapping of object relational data to XML form is as follows:

a) The mapping of object relational columns to XML elements:

For example, referring to FIG. 1A, the XML result set of a SQL query to select EMPNO and ENAME at the single row 102 would appear like the following:

```
<ROWSET>
    <ROW>
        <EMPNO>2100</EMPNO>
        <ENAME>John</ENAME>
    </ROW>
</ROWSET>
```

The object relational columns EMPNO and ENAME are mapped to corresponding COLUMN elements in the XML result set. EMPNO and ENAME are embedded in the encompassing ROW element.

b) The mapping of object relational object types to XML elements with nested sub-elements containing the attributes of the object type:

For the purpose of explanation, assume that a user-defined type called "Address_t" is previously created in the relational database. "Address_t" is a complex object type that comprises 3 scalar attributes, namely CITY, STATE and ZIP. Assume that there is a table in the relational database called Employee_table. Employee_table has 2 columns ENAME and ADDRESS. ENAME is of type "string" and ADDRESS is the user-defined type "Address_t". Further assume that columns ENAME and ADDRESS each contain only a single row of value, namely, employee name "John" and John's address, respectively.

A SQL query such as "SELECT * FROM Employee_table" can produce a SQL result set that maps to the following XML result set, according to certain embodiments of the invention:

```
<ROWSET>
    <ROW>
        <ENAME>John</ENAME>
        <ADDRESS>
            <CITY>Redwood City</CITY>
            <STATE>California</STATE>
            <ZIP>94065</ZIP>
        </ADDRESS>
    </ROW>
</ROWSET>
```

The object relational column ADDRESS maps to an element with the same tag name in the XML result set. The element ADDRESS, which is of type "address_t", has attributes CITY, STATE and ZIP that are mapped to sub-elements of the element ADDRESS. Each sub-element has the name of the attribute as its corresponding tag name in the XML result set.

c) The mapping of object relational collection types to XML lists:

For the purpose of explanation, assume that a user-defined type called "Lineitems_t" is previously created in the relational database. "Lineitems_t" is a collection object type that comprises a plurality of collection items. Each collection item has an ID attribute that defines the positional value of the item within the collection. For example, assume that there is a table in the relational database called PurchaseOrder_table. PurchaseOrder_table has 2 columns PONO for purchase order number and LINEITEMS for a list of line-items. PONO is of type "number" and LINEITEMS is of type "Lineitems_t". Further assume that columns PONO and LINEITEMS each contain a single row of value, namely, purchase order number "101" and the collection of lineitems that is associated with purchase order number "101". Assume that there is 1 item, namely, "books", in the collection of lineitems.

A SQL query such as "SELECT * FROM PurchaseOrder_table" produces a SQL result set that maps to the following XML result set:

```
<ROWSET>
    <ROW>
        <PONO>101</PONO>
        </LINEITEMS>
            <LINEITEMS_T id = "1">
                <LINEITEMNAME>BOOKS</LINEITEMNAME>
                <COST>$150</COST>
            </LINEITEMS_T>
        </LINEITEMS>
    </ROW>
</ROWSET>
```

The object relational column LINEITEMS maps to an element with the same tag name in the XML result set. Each collection item in LINEITEMS is mapped to a sub-element that is embedded within the LINEITEMS element. Each collection item has the collection type name as the tag name, namely, "LINEITEM_T". Each collection item has attributes LINEITEMNAME, and COST that are mapped to sub-elements that are embedded within the element LINEITEM_T. Each sub-element has the name of the attribute as its corresponding tag name, e.g., <LINEITEMNAME>, and <COST>.

d) The mapping of object relational REF types to URI references:

Object relational REF columns are columns for storing object references to row objects contained in any object relational table. For the purpose of explanation, assume that the relational database has a table called Employee_table. Employee_table has columns EMPTNO, ENAME and DEPTREF. EMPNO is of type "number" and assume that EMPNO has only one row of value "15". ENAME is of type "string" and assume that ENAME has only one row of value "John". DEPTREF is of type "REF" and assume that DEPTREF has only one row of value, which is a reference to a row of value corresponding to DEPTNO=1001 in another table called Department_table. Assume that Department_table is in the schema SCOTT and has columns DEPTNO with value "1001" and DEPTNAME with value "SPORTS".

A SQL query such as "SELECT EMPNO, DEPTREF FROM Employee-table produces a SQL result set that maps to the following XML result set:

```
<ROWSET>
    <ROW>
        <EMPNO>15</EMPNO>
        <DEPTREF>0344855FF4ABBCC3333</DEPTREF>
    </ROW>
</ROWSET>
```

According to certain embodiments of the invention, the REF value in the DEPTREF column is converted to XML form for the XML result set by converting the object relational REF value into a binary value that is encoded in hexadecimal ("HEX"). Thus, in the above XML result set "0344855FF4ABBCC3333" is the encoded HEX.

According to certain other embodiments of the invention, the REF value in the DEPTREF column is converted to XML form by converting the REF value into a Database Uniform Resource Indicator ("DBURI") reference. DBURI references are described in detail in U.S. patent application Ser. No. 09/949,020, filed together herewith, entitled "METHOD AND APPARATUS FOR XML VISUALIZATION OF A RELATIONAL DATABASE AND UNIVERSAL RESOURCE IDENTIFIERS TO DATABASE DATA AND METADATA," naming as inventors Muralidhar Krishnaprasad, Vishwanathan Krishnamurthy, Ravi Murthy.

Using the same example above, the DBURI reference may appear as, SCOTT/DEPARTMENT_TABLE/ROW [DEPTNO="1001"], where Deptno is the primary key information. Thus, the XML result set may appear as:

```
<ROWSET>
    <ROW>
        <EMPNO>15</EMPNO>
<DEPTREF>/SCOTT/DEPARTMENT_TABLE/ROW[DEPTNO="1001"]</DEPTREF>
    </ROW>
</ROWSET>
```

According to yet other embodiments of the invention, an object identifier that uniquely identifies the object stored in the REF column can be used in creating the DBURI reference. Using the same example above, the DBURI reference may appear as, SCOTT/DEPARTMENT_TABLE/ROW [SYS_NC_OID$="0asfgd23gfm3423n"]

Thus, the XML result set may appear as:

The invention is not limited to generating DBUri references to LOBs and REFs. A DBUri reference can be generated to reference any piece of database data that need not be inlined in the visualized document. For example, nested tables, LONGs and other datatypes may be converted to DBUri references instead of inlining the whole data inside the visualized document. The DBUri reference can be gen

```
<ROWSET>
    <ROW>
        <EMPNO>15</EMPNO>
        <DEPTREF>/Scott/Department_Table/Row[SYS_NC_OID$="0asfgd23gfm3423n"]</DEPTREF>
    </ROW>
</ROWSET>
```

According to an embodiment of the invention, LOB values may be converted to DBUri references as well. For example, if there is a column in the department table called DEPT_PHOTO, which is a BLOB column, then a DBUri reference can be used to reference the BLOB data instead of in-lining the BLOB data in the XML document.

The XML result may appear as follows for the DEPT_PHOTO column:

erated by using the primary key information or ROWID of the row in the predicates of the Xpath expression.

Mapping of Relational Database Schemas

Relational database schemas are mapped to XML form by mapping the relational database schemas to their corresponding XML-Schemas. For example, referring to FIG. 1A, in order to produce the XML result set of a SQL query

```
<ROWSET>
    <ROW>
        <DEPTNO>1001</DEPTNO>
        <DEPT_PHOTO>/SCOTT/DEPARTMENT_TABLE/ROW[DEPTNO=1001]/
DEPT_PHOTO/text()</DEPT_PHOTO>
    </ROW>
</ROWSET>
``` to select EMPNO and ENAME at the single row 102, an XML-Schema is generated. The XML-Schema defines the structure of the XML result set, which is in the form of an XML document. Thus, the XML-Schema that corresponds to the XML result set of a SQL query to select EMPNO and ENAME at the single row 102 is as follows, according to certain embodiments of the invention:

```
<xsd:schema xmlns:xsd=="http://www.w3.org/2000/10/XMLSchema">
    <xsd:element name="ROWSET">
        <xsd:complexType>
            <xsd:element name="ROW" minOccurs="0" maxOccurs="unbounded">
                <xsd:complexType>
                    <xsd:element name="EMPNO" type="xsd:integer" minOccurs="0"/>
                    <xsd:element name="ENAME" type="xsd:string" nullable="true"
minOccurs="0"/>
        </xsd:complexType>
```

```
        </xsd:element>
      </xsd:complexType>
    </xsd:element>
</xsd:schema>
```

As can be seen from the above example, in addition to defining the structure of the XML result set (XML document), XML-Schemas also define the type of the data and constraints, if any, on the data. For example, the above sample XML-Schema indicates, among other things: 1) the URL, i.e., htt://www.w3.org/2000/10/XMLSchema, for the namespace that defines the standards that apply to all XML-Schemas, 2) element ROWSET is of type "complex" and contains ROW elements, 3) the ROW elements are of type "complex" and can occur any number of times in the XML document, 3) the element EMPNO, which is embedded in the ROW element, is of type "integer", and 4) the element ENAME, which is embedded in the ROW element, is of type "string". The nullable attribute indicates whether the element value can be NULL or not. "MinOccurs" indicates the minimum number of occurrences of this element in the resultant document.

Alternatively, XML-Schemas can be "inlined" in its corresponding XML result set (XML document). For example, referring to FIG. 1A, the XML result set of a SQL query to select EMPNO and ENAME at the single row 102, can have inlined in the XML result set its corresponding XML-Schema as follows, according to certain embodiments of the invention:

type, "Address_t", is defined in relational database schema SCOTT. Thus, "Address_t" can be bound to the XML namespace that is defined by the URL, http://ora.com/SCOTT, for example.

An XML-Schema can contain object relational types from different XML namespaces. To illustrate, assume a relational database schema FOO and a relational database schema PEE is created. Further assume that the relational database schema FOO contains the user-defined type called AddressType, and the relational database schema PEE contains the user-defined type called NameType. The AddressType comprises 3 scalar attributes, namely CITY, STATE and ZIP. The NameType comprises 2 scalar attributes, namely FIRSTNAME and LASTNAME. Assume that an object relational table, EMP2, is created. EMP2 has 2 columns, namely ENAME and EADDR. ENAME contains the name of employee, "James Bond" and is of type NameType. EADDR contains the address of James Bond and is of type AddressType.

The following SQL statements illustrate the creation of database schema FOO, database schema PEE, AddressType, NameType and EMP2 in the relational database:

```
<?xml version = '1.0'?>
<DOCUMENT xmlns:xsd="http://www.w3.org/2000/10/XMLSchema">
    <xsd:schema xmlns:xsd="http://www.w3.org/2000/10/XMLSchema">
        <xsd:element name="ROWSET">
            <xsd:complexType>
                <xsd:element name="ROW" minOccurs="0" maxOccurs="unbounded">
                    <xsd:complexType>
                        <xsd:element name="EMPNO" type="xsd:integer" minOccurs="0"/>
                        <xsd:element name="ENAME" type="xsd:string" nullable="true"
minOccurs="0"/>
                    </xsd:complexType>
                </xsd:element>
            </xsd:complexType>
        </xsd:element>
    </xsd:schema>
    <ROWSET xmlns:xsi="http://www.w3.org/2000/10/XMLSchema-instance"
xsi:noNamespaceSchemaLocation="#/DOCUMENT/xsd:schema[not(@targetNamespace)]">
        <ROW num="1">
            <EMPNO>2100</EMPNO>
            <ENAME>JOHN</ENAME>
        </ROW>
    </ROWSET>
</DOCUMENT>
```

XML Namespaces

Object relational data type definitions that are associated with a given relational database schema can be bound to a corresponding XML namespace. An XML namespace is a collection of names that are used in XML documents as element types and attribute names. An XML namespace can be defined by a URL. For example, as explained herein, assume that the relational database has a user-defined type "Address_t", which is a complex object type that comprises 3 scalar attributes, namely CITY, STATE and ZIP. For the purpose of explanation, assume that the complex object

```
connect sys/sys as sysdba
grant resource,dba to foo identified by ball;
grant resource,dba to pee identified by wee;
grant execute any type to foo;
grant execute any type to pee;
connect foo/ball
create type AddressType as object (street varchar2(30), city varchar2(30),
zip number(5,0));
```

-continued

```
/
connect pee/wee
create type NameType as object (FirstName varchar2(30), LastName
varchar2(30));
/
create table Emp2
(
  ename NameType,
  eaddr foo.AddressType
);
```

The syntax used in the preceding statements is merely illustrative. The actual syntax of SQL statements may vary from implementation to implementation. The present invention is not limited to any particular syntax.

In table EMP2, the column ENAME uses the NameType that is defined for relational database schema PEE while the column EADDR uses the Address Type that is defined for relational database schema FOO.

Thus, the XML-Schema that corresponds to the XML result set of a SQL query such as SELECT * FROM EMP2 will contain separate URLs that define the XML namespace for FOO and for PEE. The XML namespace for FOO will contain the definition for AddressType. The XML namespace for PEE will contain the definition for Name-Type.

The XML-Schemas that correspond to the XML result set of a SQL query such as SELECT * FROM EMP2 are as follows, according to certain embodiments of the invention:

```
<xsd:schema xmlns:FOO="http://ns.oracle.com/xdb/FOO"
  xmlns:xsd="http://www.w3.org/2000/10/XMLSchema"
  xmlns:PEE="http://ns.oracle.com/xdb/PEE">
  <xsd:element name="ROWSET">
    <xsd:complexType>
      <xsd:element name="ROW" minOccurs="0"
        maxOccurs="unbounded">
        <xsd:complexType>
          <xsd:element name="ENAME" type="PEE:NAMETYPE"
            nullable="true" minOccurs="0"/>
          <xsd:element name="EADDR"
            type="FOO:ADDRESSTYPE" nullable="true"
            minOccurs="0"/>
        </xsd:complexType>
      </xsd:element>
    </xsd:complexType>
  </xsd:element>
</xsd:schema>
<schema targetNamespace="http://ns.oracle.com/xdb/FOO"
  xmlns="http://www.w3.org/2000/10/XMLSchema"
  xmlns:FOO="http://ns.oracle.com/xdb/FOO">
  <complexType name="ADDRESSTYPE">
    <element name="STREET" type="string" nullable="true"
      minOccurs="0"/>
    <element name="CITY" type="string" nullable="true"
      minOccurs="0"/>
    <element name="ZIP" type="integer" nullable="true"
      minOccurs="0"/>
  </complexType>
</schema>
<schema targetNamespace="http://ns.oracle.com/xdb/PEE"
  xmlns="http://www.w3.org/2000/10/XMLSchema"
  xmlns:PEE="http://ns.oracle.com/xdb/PEE">
  <complexType name="NAMETYPE">
    <element name="FIRSTNAME" type="string" nullable="true"
      minOccurs="0"/>
    <element name="LASTNAME" type="string" nullable="true"
      minOccurs="0"/>
  \ </complexType>
</schema>
```

Alternatively, XML-Schemas can be "inlined" in its corresponding XML result set that contains the target data, namely, the name and address of the employee in EMP2. According to certain embodiments of the invention, the XML result set shows its corresponding XML-schemas "inlined":

```
<?xml version = '1.0'?>
<DOCUMENT xmlns:xsd="http://www.w3.org/2000/10/XMLSchema">
  <schema targetNamespace="http://ns.oracle.com/xdb/PEE"
    xmlns="http://www.w3.org/2000/10/XMLSchema"
    xmlns:PEE="http://ns.oracle.com/xdb/PEE">
    <complexType name="NAMETYPE">
      <element name="FIRSTNAME" type="string" nullable="true"
        minOccurs="0"/>
      <element name="LASTNAME" type="string" nullable="true"
        minOccurs="0"/>
    </complexType>
  </schema>
  <schema targetNamespace="http://ns.oracle.com/xdb/FOO"
    xmlns="http://www.w3.org/2000/10/XMLSchema"
    xmlns:FOO="http://ns.oracle.com/xdb/FOO">
    <complexType name="ADDRESSTYPE">
      <element name="STREET" type="string" nullable="true" minOccurs="0"/>
      <element name="CITY" type="string" nullable="true" minOccurs="0"/>
      <element name="ZIP" type="integer" nullable="true" minOccurs="0"/>
    </complexType>
  </schema>
  <xsd:schema xmlns:FOO="http://ns.oracle.com/xdb/FOO"
    xmlns:xsd="http://www.w3.org/2000/10/XMLSchema"
    xmlns:PEE="http://ns.oracle.com/xdb/PEE">
    <xsd:import targetNamespace="http://ns.oracle.com/xdb/PEE"
      schemaLocation="#/DOCUMENT/xsd:schema[@targetNamespace='http://ns.oracle.com/xdb/PEE']"/>
    <xsd:import targetNamespace="http://ns.oracle.com/xdb/FOO"
      schemaLocation="#/DOCUMENT/xsd:schema[@targetNamespace='http://ns.oracle.com/xdb/FOO']"/>
```

-continued

```
<xsd:element name="ROWSET">
  <xsd:complexType>
    <xsd:element name="ROW" minOccurs="0" maxOccurs="unbounded">
      <xsd:complexType>
        <xsd:element name="ENAME" type="PEE:NAMETYPE"
nullable="true" minOccurs="0"/>
        <xsd:element name="EADDR" type="FOO:ADDRESSTYPE"
nullable="true" minOccurs="0"/>
      </xsd:complexType>
    </xsd:element>
  </xsd:complexType>
</xsd:element>
</xsd:schema>
<ROWSET xmlns:xsi="http://wwww.w3.org/2000/10/XMLSchema-instance"
xsi:noNamespaceSchemaLocation="#/DOCUMENT/xsd:schema[not@targetNames
pace)]">
  <ROW num="1">
    <ENAME>
      <FIRSTNAME>James</FIRSTNAME>
      <LASTNAME>Bond</LASTNAME>
    </ENAME>
    <EADDR>
      <STREET>00 secret ave</STREET>
      <CITY>London</CITY>
      <ZIP>39281</ZIP>
    </EADDR>
  </ROW>
</ROWSET>
</DOCUMENT>
```

Hardware

Figure 2:
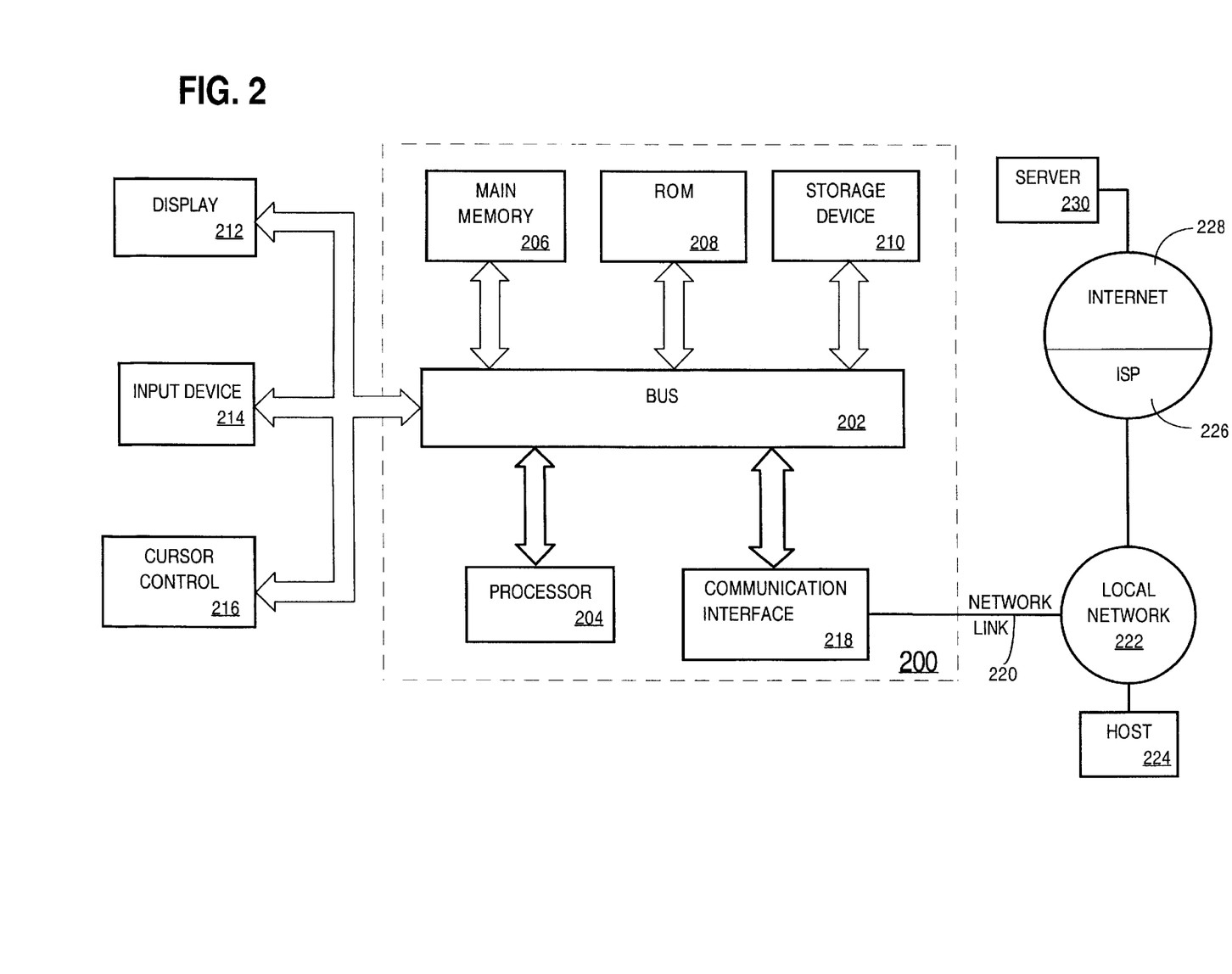
FIG. 2 depicts a computer upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are implemented by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application implements the techniques described herein.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing data, the method comprising the steps of:

receiving, at a database server, a relational database query to retrieve data that resides in a relational database; and
the database server responding to the relational database query by
extracting, from one or more fields within the relational database, content for one or more XML documents;
wherein the content is stored within said one or more fields in the form of one or more data types that are natively supported by the relational database;
wherein the content is not stored within said one or more fields in the form of XML documents within the relational database;
constructing, within the database server, said one or more XML documents based on the content extracted from the one or more fields; and
providing said one or more XML documents as a result of the relational database query in the form of one or more XML documents.

2. The method of claim 1, wherein the relational database query specifies which values that answer the relational database query are to be contained in the one or more XML documents, and which other values that answer the relational database query are to be referenced in the one or more XML documents by reference links.

3. The method of claim 1, wherein the step of providing said one or more XML documents as a result to the relational database query in the form of one or more XML documents comprises providing an XML document in which some values that are selected by the relational database query are contained in the XML document and other values that are selected by the relational database query are referenced in the XML document.

4. The method of claim 1 further comprising the step of, during a processing of the relational database query, generating one or more XML-schemas that describe features of the one or more XML documents, wherein the features comprise structure of the one or more XML documents.

5. The method of claim 4, further comprising the database server storing at least one of the one or more XML-schemas within at least one of the one or more XML documents.

6. The method of claim 1 further comprising the step of, during a processing of the relational database query, generating one or more XML-schemas that describe features of the one or more XML documents, wherein the features comprise constraints of the one or more XML documents.

7. The method of claim 4, wherein the one or more XML-schemas correspond to metadata that is associated with the data that is retrieved in response to the relational database query.

8. The method of claim 4, wherein the one or more XML-schemas comprise relational database object types from one or more XML namespaces, wherein one or more relational database schemas are mapped to each of the one or more XML namespaces.

9. The method of claim 1, further comprising generating the one or more XML documents, and wherein the step of generating the one or more XML documents comprises using a set of rules that is stored in the relational database to determine how to structure data contained in the one or more XML documents.

10. The method of claim 1, wherein the relational database query selects a plurality of rows in the relational database and wherein the one or more XML documents include aggregate data, wherein the aggregate data is produced by the database server performing an aggregate function on the data from the plurality of rows.

11. The method of claim 9, wherein the set of rules comprises rules for mapping a relational database object to a corresponding Database Uniform Resource Indicator reference.

12. The method of claim 9, wherein the set of rules comprises rules for mapping a query language reference to a corresponding Database Uniform Resource Indicator reference.

13. The method of claim 9, wherein the set of rules comprises rules for mapping relational data that is associated with a LOB column to a corresponding Database Uniform Resource Indicator reference.

14. The method of claim 1, wherein the relational database query is satisfied by a plurality of rows, and the one or more XML documents include a single XML document for said plurality of rows.

15. A computer-readable medium carrying one or more sequences of instructions of providing data, which instructions, when executed by one or more processors, cause the one or more processors to carry out the steps:

receiving, at a database server, a relational database query to retrieve data that resides in a relational database; and the database server responding to the relational database query by extracting from one or more fields within the relational database content for one or more XML documents, wherein the content is not stored in the form of XML documents within the relational database;

constructing, within the database server, said one or more XML documents; and providing said one or more XML documents as a result of the relational database query in the form of one or more XML documents.

16. The computer-readable medium of claim 15, wherein the relational database query specifies which values that answer the relational database query are to be contained in the one or more XML documents, and which other values that answer the relational database query are to be referenced in the one or more XML documents by reference links.

17. The computer-readable medium of claim 15, wherein the step of providing said one or more XML documents as a result to the relational database query in the form of one or more XML documents comprises providing an XML document in which some values that are selected by the relational database query are contained in the XML document and other values that are selected by the relational database query are referenced in the XML document.

18. The computer-readable medium of claim 15 further comprising the step of, during a processing of the relational database query, generating one or more XML-schemas that describe features of the one or more XML documents, wherein the features comprise structure of the one or more XML documents.

19. The computer-readable medium of claim 18 further comprising the database server storing at least one of the one or more XML-schemas within at least one of the one or more XML documents.

20. The computer-readable medium of claim 15 further comprising the step of, during a processing of the relational database query, generating one or more XML-schemas that describe features of the one or more XML documents, wherein the features comprise constraints of the one or more XML documents.

21. The computer-readable medium of claim 18, wherein the one or more XML-schemas correspond to metadata that is associated with the data that is retrieved in response to the relational database query.

22. The computer-readable medium of claim 18, wherein the one or more XML-schemas comprise database object types from one or more XML namespaces, wherein one or more relational database schemas are mapped to each of the one or more XML namespaces.

23. The computer-readable medium of claim 15, further comprising generating the one or more XML documents, and wherein the step of generating the one or more XML documents comprises using a set of rules that is stored in the relational database to determine how to structure data contained in the one or more XML documents.

24. The computer-readable medium of claim 15, wherein the relational database query selects a plurality of rows in the relational database and wherein the one or more XML documents include aggregate data, wherein the aggregate data is produced by the database server performing an aggregate function on the data from the plurality of rows.

25. The computer-readable medium of claim 23, wherein the set of rules comprises rules for mapping a relational database object to a corresponding Database Uniform Resource Indicator reference.

26. The computer-readable medium of claim 23, wherein the set of rules comprises rules for mapping a query language reference to a corresponding Database Uniform Resource Indicator reference.

27. The computer-readable medium of claim 23, wherein the set of rules comprises rules for mapping relational data that is associated with a LOB column to a corresponding Database Uniform Resource Indicator reference.

28. The computer-readable medium of claim 15, wherein the relational database query is satisfied by a plurality of rows, and the one or more XML documents include a single XML document for said plurality of rows.

29. The method of claim 1, wherein the one or more fields within the relational database comprise two or more one or more fields within the relational database.

30. The computer-readable medium of claim 15, wherein the one or more fields within the relational database comprise two or more one or more fields within the relational database.

* * * * *